United States Patent [19]

Sherman

[11]  4,275,179

[45]  Jun. 23, 1981

[54] POLY(p-METHYLSTYRENE) POLYBLEND

[75] Inventor: Anthony M. Sherman, Edison, N.J.

[73] Assignee: Mobil Oil Corporation, New York, N.Y.

[21] Appl. No.: 77,975

[22] Filed: Sep. 24, 1979

[51] Int. Cl.$^3$ .............................................. C08L 53/02
[52] U.S. Cl. ........................................ 525/98; 525/95
[58] Field of Search ...................... 525/98, 241; 529/95

[56]  References Cited

U.S. PATENT DOCUMENTS 3,629,211  12/1971  Nozaki ................................. 525/241
3,784,587  1/1974  Chambers .............................. 525/98

Primary Examiner—Hosea E. Taylor
Assistant Examiner—Amelia B. Yarbrough
Attorney, Agent, or Firm—Charles A. Huggett; Hastings S. Trigg

[57] ABSTRACT

This invention provides a blend of poly(p-methylstyrene) and a styrene-conjugated diolefin block copolymer containing between about 60 weight percent and about 80 weight percent styrene; the weight ratio of poly(p-methylstyrene: styrene-conjugated diolefin block copolymer being between about 70:30 and about 40:60.

3 Claims, No Drawings

POLY(p-METHYLSTYRENE) POLYBLEND

BACKGROUND OF THE INVENTION

1. Field of the Invention

This invention is concerned with blends of poly(p-methylstyrene) and certain styrene-butadiene block copolymers, which have good optical clarity.

2. Description of the Prior Art

It has been proposed to blend polystyrene with styrene-conjugated diene block copolymers. Insofar as is now known, blends of poly (p-methylstyrene) with styrene-conjugated diene block copolymers have not been proposed. It is the discovery of this invention that the latter blends have significantly higher light transmission and lower haze.

SUMMARY OF THE INVENTION

This invention provides a blend of poly(p-methylstyrene) and a styrene-conjugated diolefin block copolymer containing between about 60 weight percent and about 80 weight percent styrene; the weight ratio of poly(p-methylstyrene): styrene-conjugated diolefin block copolymer being between about 70:30 and about 40:60.

DESCRIPTION OF SPECIFIC EMBODIMENTS

The monomer used in preparing the homopolymer from which the blends of this invention are made is p-methylstyrene. It is within the contemplation of this invention to use mixtures of methylstyrene rich in p-methylstyrene. Such mixtures contain at least 95 weight percent, preferably 97–99 weight percent, p-methylstyrene and less than 0.1 weight percent o-methylstyrene with the balance being m-methylstyrene. A typical mixture contains, by weight, about 97 percent p-methylstyrene, about 3 percent m-methylstyrene, and about 0.05 percent o-methylstyrene. The mixtures are obtained by catalytic dehydrogenation of the mixtures of ethylmethyl benzene isomers described in U.S. Pat. No. 4,086,287 to which reference is made.

The polymers contemplated herein are p-methylstyrene or p-methylstyrene-rich isomer mixture homopolymer. The polymerization reaction is carried out by using methods and catalysts well known in the art for polymerizing styrene. The reaction can be carried out in solution, bulk, suspension, or emulsion.

The block copolymers to be employed in the present blends have the general configuration

A-B-A wherein each A is a polymer block of styrene and B is a polymer block of a conjugated diene, as well as hydrogenated derivatives of such block copolymers. The conjugated dienes to be employed in the formation of the polymer block B preferably have from 4–8 carbon atoms per molecule and still more preferably from 4–5. Thus, the preferred species are butadiene and isoprene, although methylisoprene and other conjugated dienes may be utilized, as well as mixtures thereof. Hence, the preferred block copolymers are polystyrene-polybutadiene-polystyrene and polystyrene-polyisoprene-polystyrene, as well as hydrogenated derivatives of these polymers.

The hydrogenated materials may be hydrogenated to any desired extent, although the substantially complete hydrogenation of at least the conjugated diene polymer block is desirable. In any event, if hydrogenation is resorted too, it is desired to reduce the original unsaturation of the block copolymer by at least about 50 and preferably by at least about 90%. The reasons for hydrogenation are broadly two-fold in that hydrogenation increases the stability of the product as well as raises the softening point thereof. The ABA block copolymer will contain between about 60 weight percent and about 80 weight percent styrene, the balance being conjugated diolefin. The preparation of a typical ABA block copolymer is illustrated by a styrene-isoprene-styrene block copolymer. The first polymer block comprising polystyrene terminated with lithium is formed in a zone by introduction of styrene, cyclohexane (as solvent), and secondary butyl lithium into the polymerization zone. After formation of the first polymer block, the second stage in the process wherein the elastomeric polymer block is formed is effected by introduction of isoprene into the reaction mixture, preferably together with further solvent including a refluxing phase for temperature control. This results in the formation of an intermediate block copolymer comprising a first block of polystyrene and a second block of polyisoprene terminated with lithium. In the third stage of the process, more styrene is added to the reaction mixture and polymerization continued to form the three block polymers A-B-A, still terminated with lithium which is removed in the final stage of the process by the addition of a chain terminator such as an alcohol or the like.

In addition to A-B-A block copolymers, it is also practical to use A-B block copolymers. Likewise, sequential A-B-A-B-A etc. block copolymers could be used.

The catalysts to be used in the process of preparing the block copolymers comprise alkyl lithium compounds which may be either secondary or tertiary alkyls. These will have the general configuration

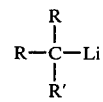

wherein each R is an alkyl radical and R' is hydrogen or alkyl. They include particularly secondary butyl lithium, tertiary butyl lithium, secondary amyl lithium, tertiary amyl lithium, secondary hexyl lithium, tertiary hexyl lithium and other alkyl lithium compounds preferably having from 4 to 8 carbon atoms per molecule.

The proportion of initiator taking an active part in the block copolymerization will be varied between about 100 and about 2000 parts per million, based on the weight of the total monomers used.

Polymerization will be conducted at temperatures in the order of minus 20 to about 100° C., preferably at temperatures between about 20° and 65° C., the temperature being controlled to yield the polymer product within a reasonable length of time at the initiator level being utilized.

The conditions of polymerization are adjusted so as to produce a first polymeric block having an average molecular weight between about 2,000 and 100,000. Having formed this first polymer block, the next stage in the process comprises addition of the second type of monomer, in this illustrative instance being a conjugated diene, such as one of those enumerated above. The proportion of monomer, assuming substantially complete polymerization thereof, will be sufficient to form a polymer block having an average molecular weight between about 25,000 and 1 million. Since, under the conditions of the process, the first polymer block is a "living polymer chain" terminated with a lithium radical, the block polymerization proceeds at the end of each of these living chains to form an intermediate two-block polymer having the structure A-B-Li. After completion of the second polymer block, the terminal polymer block will be formed by introduction of the same or a different alkenyl-substituted aromatic hydrocarbon such as styrene. Again, this block copolymerizes with the living polymer chains and results under the conditions employed in the formation of a living three-block polymer having the general configuration A-B-A-Li. The lithium is deactivated and the polymerization terminated by the injection at this point of a suitable chain terminator such as an alcohol, $H_2O$ or other known agents for this purpose.

Block copolymerization is preferably conducted in the presence of solvents. These must be chosen with some care for two principal aspects: If a borderline solvent system is utilized, in which the block copolymer at any stage in its preparation becomes somewhat insoluble, the danger exists that chain growth will be slow and non-uniform from monomer being rendered inaccessible to the growing chains at that point, resulting in broad molecular weight distributions both for the block in question and for the next block to form thereon. Precipitation of a polymer at any stage may be due either to insolubility of the particular species at that time in the solvent present but may be strongly affected by the temperature utilized for the polymerization procedure. Solvents may be selected for a secondary purpose, namely, the control of temperature during polymerization by reflux. Consequently, the temperature and solvent chosen for the process both have powerful effects on the ultimate properties of the polymerization product.

When the block copolymer being formed is one in which the two terminal blocks are polystyrene blocks, it is preferable to employ a cyclic hydrocarbon, which may be either a cycloaliphatic such as cyclohexane or a member of the benzene series such as benzene or toluene. The former type namely, cycloaliphatic hydrocarbon, is preferred since such materials are more easily purified. It is realized that mere traces of certain impurities such as acetylenic impurities may have powerful deleterious effects upon the continuance of polymerization in the presence of the extremely small proportions of catalyst required.

The weight ratio of poly (p-methylstyrene): styrene-conjugated diolefin-styrene block copolymer in the blend will be between about 70:30 and about 40:60, preferably about 50:50. Blending of the components is effected by any procedure well known in the art including mixing in a Brabender mixer, extruder mixing, and mixing in a 2-roll differential speed mixer.

EXAMPLE 1

A polyblend of 25 g. pellets of poly(p-methylstyrene) and 25 g. pellets of ABA block copolymer (styrene-butadiene-styrene linear block copolymer containing, by weight, 70% styrene and 30% butadiene, m.w. 140,000) tumbling the pellets to mix and feeding them into the head of a Brabender mixer. Blending conditions were 75 r.p.m. at 180° C. for 10 min. The sample was removed and cut into strips for molding. Test specimens were prepared by compression molding at 200° C. for 12 min. under 30,000 lbs. ram force on a 12"×12" mold to a thickness of 20 mils.

EXAMPLE 2

Example 1 was repeated except that commercial general purpose polystyrene was used instead of poly(p-methylstyrene).

The molded samples were tested for physical properties. Test results are set forth in the following table.

TABLE

| PROPERTY | Example 1 | Example 2 |
|---|---|---|
| Light transmission, % | 87.3 | 68.4 |
| Haze, % | 18.5 | 32.1 |
| Melt Index(G), g./10 min. | 5.33 | 9.62 |
| Hardness, Shore D | 70 | 71.5 |
| Vicat Softening Pt., °C. | 91 | 84 |
| Flexural Modulus, psi. | $1.8 \times 10^5$ | $1.8 \times 10^5$ |

From the data in the Table, it will be noted that the physical properties of the two blends were generally similar. Unexpectedly, however, the optical properties of the blend containing poly (p-methylstyrene) are extremely better, with higher light transmission and lower haze. These properties render the blends of this invention useful in packaging wherein the packaged article must be clearly visible, such as bags, overwrapping, e.g., produce packaging, and blister packaging.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A blend of poly (p-methylstyrene) and a styrene-conjugated diolefin block copolymer containing between about 60 weight percent and about 80 weight percent styrene; the weight ratio of poly (p-methylstyrene): styrene-conjugated diolefin block copolymer being between about 70:30 and about 40:60.

2. The blend of claim 1, wherein said conjugated diolefin is butadiene.

3. The blend of claim 2, wherein said block copolymer is an ABA styrene-butadiene-styrene linear block copolymer containing about 70 weight percent styrene and having a molecular weight of about 140,000 and said weight ratio is about 50:50.

* * * * *